United States Patent [19]

Taureg

[11] Patent Number: 5,044,480
[45] Date of Patent: Sep. 3, 1991

[54] FLUID FRICTION COUPLING

[75] Inventor: Herbert Taureg, Hennef, Fed. Rep. of Germany

[73] Assignee: Viscodrive GmbH, Lohmar, Fed. Rep. of Germany

[21] Appl. No.: 537,368

[22] Filed: Jun. 13, 1990

[30] Foreign Application Priority Data

Jun. 26, 1989 [DE] Fed. Rep. of Germany ....... 3920790

[51] Int. Cl.$^5$ ............................................. F16D 31/00
[52] U.S. Cl. .................................. 192/58 B; 192/48.3
[58] Field of Search ................... 192/48.3, 48.92, 58 B

[56] References Cited

U.S. PATENT DOCUMENTS

| 4,562,897 | 1/1986 | Renneker | 192/58 B X |
| 4,718,301 | 1/1988 | Friedrich | 192/58 B X |
| 4,848,506 | 7/1989 | Shimada et al. | 192/48.31 X |
| 4,848,507 | 7/1989 | Masuda et al. | 192/48.92 X |
| 4,889,353 | 12/1989 | Hamada et al. | 192/48.92 X |
| 4,899,859 | 2/1990 | Teraoka | 192/58 B X |
| 4,942,951 | 7/1990 | Kriebernegg et al. | 192/58 B X |

FOREIGN PATENT DOCUMENTS

| 3609419 | 10/1986 | Fed. Rep. of Germany | 192/48.3 |
| 63-186042 | 8/1988 | Japan | 192/48.92 |
| 63-186043 | 8/1988 | Japan | 192/48.92 |
| 2200434 | 8/1988 | United Kingdom | 192/58 B |

Primary Examiner—Allan D. Herrmann
Assistant Examiner—Nicholas Whitelaw
Attorney, Agent, or Firm—Toren, McGeady & Associates

[57] ABSTRACT

The invention relates to a fluid friction coupling having a housing, with outer plates being non-rotatingly associated therewith and further outer plates being associated therewith so as to be non-rotating in one direction only. The outer plates which are designed to be non-rotating in one direction of rotation only, have resilient tongues which are axially deflected from the plane face of the plate and which are laterally supported on faces of the webs with slots inserted into the housing. With their outer circumference, the plates are guided in the slots of the webs. In the direction of torque transmission, the movement of the housing is transferred via the side faces of the webs on to the resilient tongues and thus with the plates. The plates are driven by the housing. In the other direction of rotation, the housing may overtake the plates in that the webs slide with their slots over the resilient tongues. Between two adjoining outer plates and there are arranged inner plates which are driven as a result of the shearing viscous medium between the plates and which service to drive a hub. Thus, in the two possible directions of rotation, the coupling is capable of transmitting different torques or achieves a complete freewheeling effect in one direction of rotation.

12 Claims, 5 Drawing Sheets

FLUID FRICTION COUPLING

BACKGROUND OF THE INVENTION

The invention relates to a fluid friction coupling having a housing as a first coupling part and at least one hub rotatably supported therein as a further coupling part, outer plates non-rotatingly associated with the housing, as well as inner plates non-rotatingly associated with the hub(s). The outer and inner plates are alternately arranged in a certain sequence and at least the plates of one of the plate sets are arranged so as to be axially movable. The part of the housing interior not occupied by plates is at least partially filled with a viscous medium, especially silicone oil, and different torques are to be transmitted in the two directions of rotation.

When slip occurs at the directly driven motor vehicle wheels on the road surface with a lower adhesion coefficient, it is desirable to generate a traction force for the further wheels. For generating the necessary torque for passing the traction force onto the non-driven wheels, such drives are frequently combined with fluid friction couplings which, for example, eliminate the differential effect of a so-called open differential at least partially or supply torque directly to the wheels not driven directly.

From DE-OS 33 17 247, for example, it is known to derive a rotary movement for the front wheel drive vehicle from the differential of the front axle and pass it on via the driveline to the rear wheels, with a fluid friction coupling being incorporated into the driveline. If both the rear and front wheels rotate at the same speed or if the speeds of the two axles do not deviate greatly, there is no relative movement in the fluid friction coupling generating a substantial torque. However, if there does occur such a speed differential, the plate sets, which are part of the coupling, move relative to each other. In the process, the fluid contained in the remaining space in the housing is sheared between the plates, with a torque building up as a result. If, for example, the front wheels of the front wheel drive vehicle are subject to slip, a torque is built up and passed to the rear wheels. If the vehicle is braked, with the front wheels possibly being blocked, there also occurs a speed differential and thus a relative movement between the plates. In this condition, the rear wheels rotate faster than the front wheels and a torque trying to block the rear wheels as well is built up. The object is to prevent such a condition because it causes the vehicle to lose its lateral guidance.

SUMMARY OF THE INVENTION

Accordingly, it is an object of the present invention to use a freewheeling unit which ensures that no torque is built up when the rear wheels rotate faster than the front wheels.

It is a further object of the present invention to provide a fluid friction coupling which transmits full torque for the main driving direction of rotation whereas it transmits only a reduced amount of torque in the other direction of rotation. In cases where no or only a low torque is to be transmitted, for example if an indirect drive is effected via the rear wheels, the coupling is to be switched to the lowest torque level.

Pursuant to this object, and others which will become apparent hereafter, one aspect of the present invention resides in at least part of the plates associated with a coupling part being held non-rotatingly in one direction of rotation and relatively rotatably in the opposite direction of rotation relative to the coupling part with which they are associated.

By fixing the number of plates held so as to be freely rotating in one direction of rotation relative to the other plates non-rotatingly associated with the coupling part in both directions of rotation, it is possible to set the torque ratio. By selecting this design it is possible to ensure that even during reversing a certain amount of torque can be transmitted to the axle not driven directly. However, even if all plates associated with the coupling part associated with the plates held non-rotatingly in one direction of rotation only, are provided with a freewheeling function, the coupling can be almost switched off completely. The torque to be transmitted in the other torque direction or in the overtaking direction is reduced or decreases towards zero.

To achieve a freewheeling effect of part of the plates or all plates, it is not necessary to provide a special freewheeling coupling. The freewheeling function is generated by the special way in which the plates themselves are held.

This freewheeling function is achieved in accordance with a further essential feature of the invention in that the coupling part, with which the plates relatively rotatable in one direction of rotation are associated, are provided with evenly circumferentially distributed webs which extend parallel to the axis of rotation and which comprise slots distributed along the axis of rotation and extending at right angles relative thereto. The rotatable plates are guided in the slots and comprise tongues which are arranged so as to correspond to the position of the slots and whose free ends, in the direction of torque transmission, are supported on the webs at the sides of the slots.

Such a design ensures in a simple way that the resilient tongues in cooperation with the slots in the webs act as freewheeling elements. When torque is transmitted, the plates are driven from the coupling part receiving them, via webs and the resilient tongues. If the coupling part, comprising the plates driveable only in one direction of rotation, is rotated in the direction opposite to the driving direction, the resilient tongues may move back into the plane of the respective plate and slide through the slot of the respective web. After having left the slot, the tongues axially spring out of the plane of the plate and, with rotation taking place in the opposite direction, they may be laterally supported on the next web.

A further advantage is that no modifications need to be carried out on the housing. The difference in torque for the two directions of rotation may be varied to suit the respective application simply by fixing the ratio of the number of plates held non-rotatingly and those held non-rotatingly in one direction only.

In a preferred embodiment, the tongues are designed to be axially resilient in the direction of the axis of rotation, the advantage of this design measure being that centrifugal forces do not affect the magnitude of the torque transmitted.

According to a further embodiment of the invention, the resilient tongues form part of the plates and are produced by being punched or bent out of the plane face.

Furthermore, it is proposed that the webs should either form part of the associated coupling part or be designed as separate components while being connected to the associated coupling part in a form-fitting or material-locking way.

In a preferred embodiment, the webs are designed as wedges inserted into corresponding grooves of the associated coupling part. The grooves may be produced by broaching, for example. The webs required for a fluid friction coupling may be provided jointly, in the form of a package, with slots in order to avoid any dividing errors.

In order to avoid any catching during the freewheeling mode, the rotatable plates, opposite the free ends of the tongues, are provided with inclined running-in faces. This ensures constant overlapping between the slot and the plate in the region of the resilient tongues.

In another embodiment, the housing is the coupling part with which the plates designed as outer plates rotatable in one direction of rotation are associated. As an alternative, it is also conceivable for the hub to be the coupling part with which the plates designed as inner plates rotatable in one direction of rotation are associated.

According to a further feature of the invention, the fluid friction coupling is arranged in the driveline leading from the permanently driven axle to a further driveable axle of a four wheel drive vehicle, with the coupling part comprising the plates non-rotatingly held in only one direction of rotation being non-rotatingly connected to the drive of the permanently driven axle and with the tongues, in the direction of rotation corresponding to forward traction, being non-rotatingly supported on the webs of the coupling.

This is an easy way of providing a drive assembly in the case of which there is no need for a freewheeling coupling, and as a rule it is sufficient if only a very small amount of torque is transmittable in the other direction of rotation. As a rule, four wheel drive or torque transfer to the rear wheels is mainly required for forward driving.

In addition, however, it is also conceivable (as known in the case of freewheeling couplings combined with fluid friction couplings) to provide a bridging coupling via which freewheeling may be blocked during reversing. This measure ensures that even during reversing the full amount of torque is passed on to the rear wheels.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings which show a preferred embodiment as used in a front wheel drive vehicle.

DETAILED DESCRIPTION OF THE PREFERRED EMBODIMENTS

Figure 1:
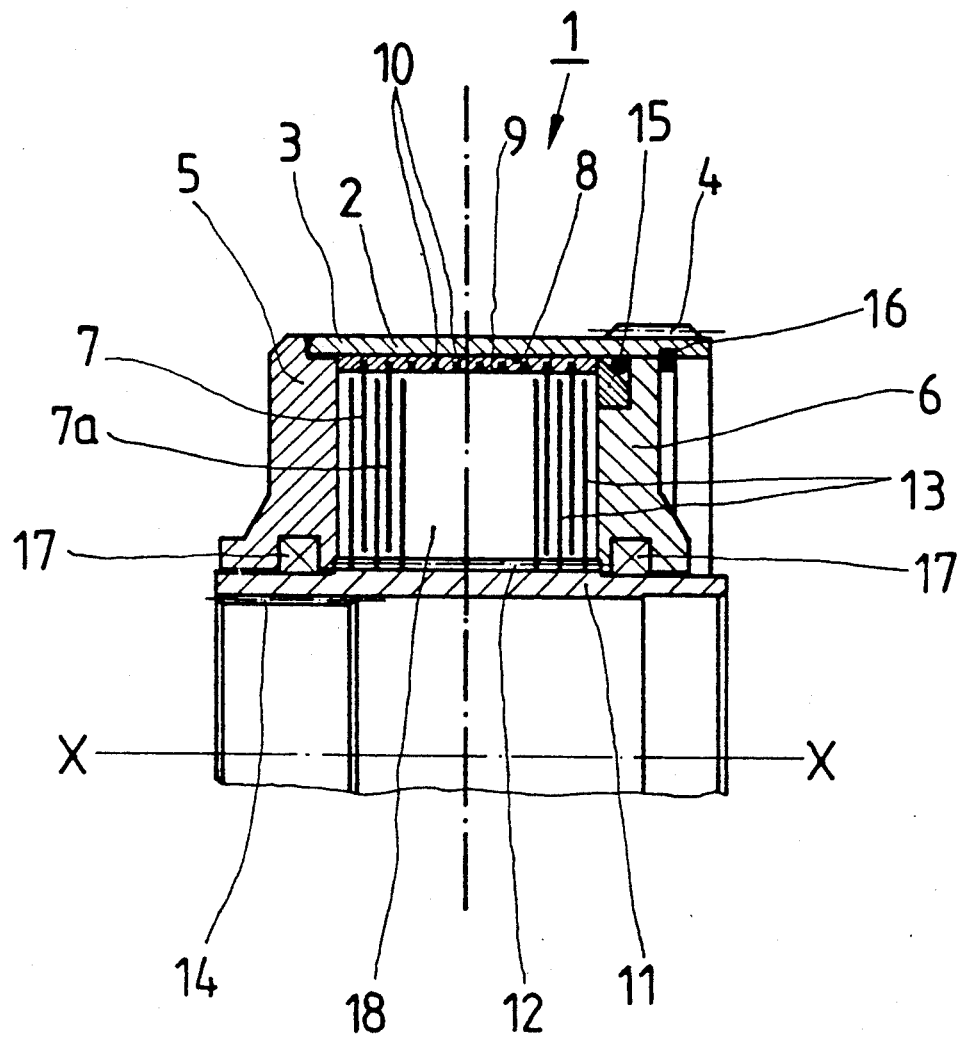
FIG. 1 is a semi-section through a fluid friction coupling.

The fluid friction coupling 1 shown in FIGS. 1 to 4 comprises a housing 2 consisting of a cylindrical casing 3, a first fixed cover 5 firmly attached laterally thereto and a loose cover 6 inserted into the casing 3. Between the inner faces of the two covers 5, 6 facing each other, the housing 2, in the inner face of the casing 3, is provided with circumferentially distributed grooves 8. The grooves 8 extend parallel to the axis of rotation x—x. Webs 9 in the form of wedges are inserted into the grooves 8 and are secured against displacement by the cover 6 which is held in the housing casing 3 by a securing ring 16. Furthermore, the cover 6 is sealed relative to the casing 3 by a seal 15.

A hub 11 supported in bores of the two covers 5, 6 is arranged so as to be concentric relative to the housing 2. In these regions, the outer face of the hub 11 is closed relative to the two covers 5, 6 by seals 17. In the region between the inner faces of the two covers 5, 6, the hub 11, on its outer face, is provided with teeth 12 which extend parallel to the axis of rotation x—x and in which annular inner plates 13 are received so as to be non-rotating but axially movable.

The housing 2 is associated with outer plates 7, 7a which, along the axis of rotation x—x, are arranged so as to alternate with the inner plates 13. Some of the outer plates 7, 7a, i.e. plates 7a, are designed so as to be freely rotatable in one direction. Both outer plates 7, 7a are arranged so as to be guided in slots 10 of the webs 9 distributed along the axis of rotation x—x. The outer plates 7 are non-rotatingly held in or relative to the webs 9 in both possible directions of rotation of the fluid friction coupling 1, whereas the outer plates 7a non-rotatingly cooperate with the webs 9 and thus with the outer part in one direction of rotation only.

Figure 2:
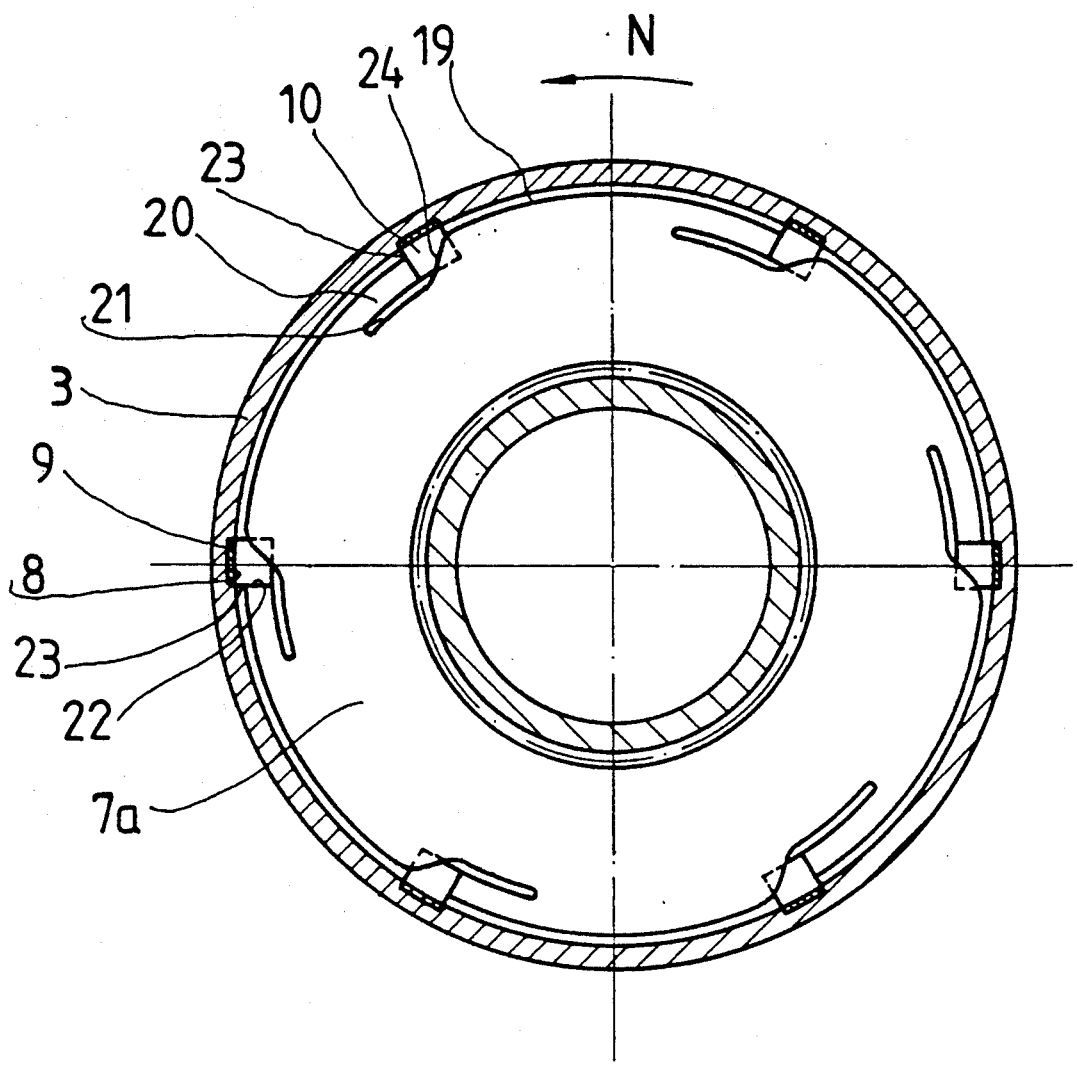
FIG. 2 is a cross-section according to FIG. 1.
Figure 4:
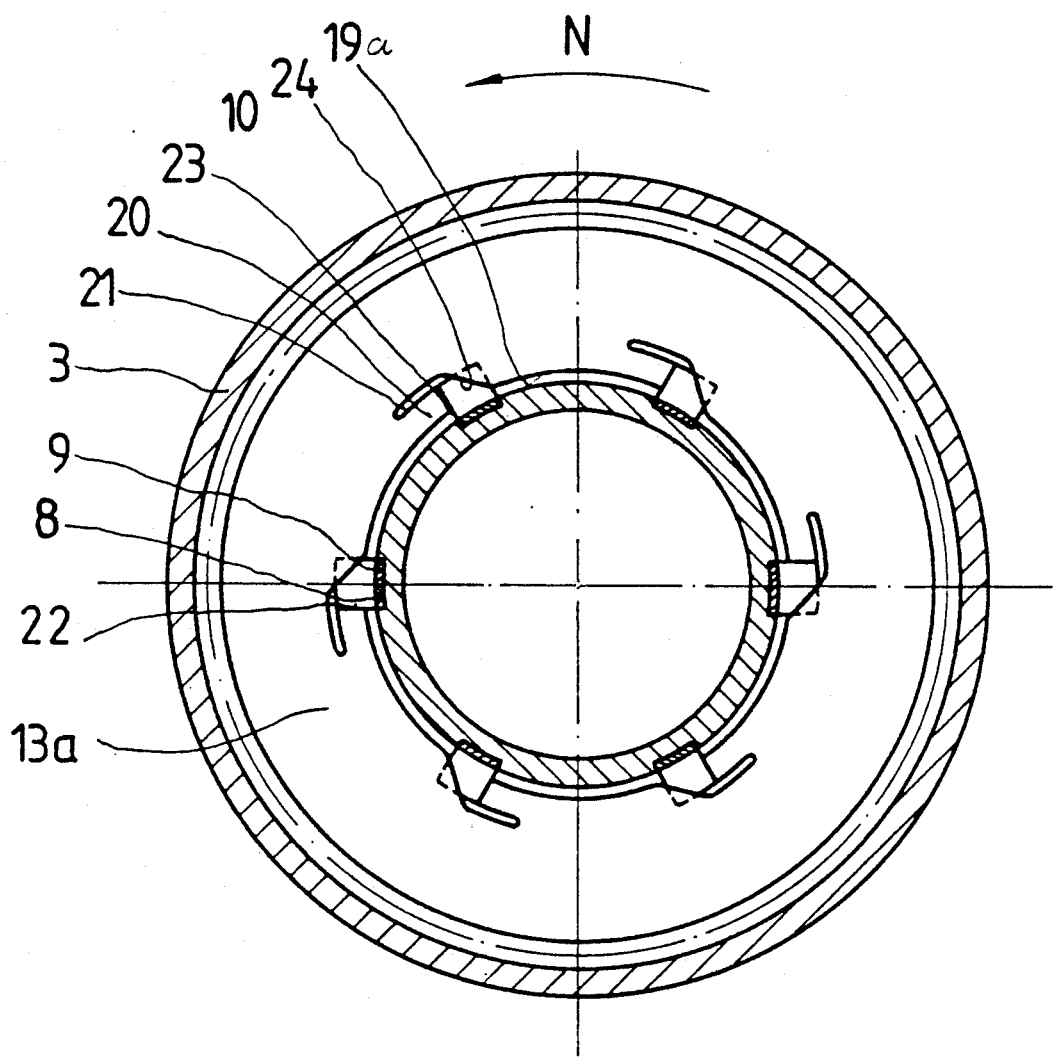
FIG. 4 shows the resilient tongues associated with the inner circumference of the inner plates.

The design of the outer plates 7a ensuring this way of functioning is particularly apparent from FIGS. 2 and 4. The input and output means of the fluid friction coupling 1 are teeth, one set of which, i.e. the teeth 4, are arranged on the outer face of the housing casing 3, whereas the other driving teeth 14 are accommodated in the bore of the hub 11. Via these teeth 4, 14, the fluid friction coupling 1 may be connected to an input and output part.

The part of the interior 18 of the housing not occupied by outer plates 7, 7a and inner plates 13 is at least partially filled with a viscous medium, especially silicone oil. The transmission of torque between the outer plates 7, 7a and the inner plates 13 is effected by shearing of the viscous medium, e.g. silicone oil.

Figure 3:
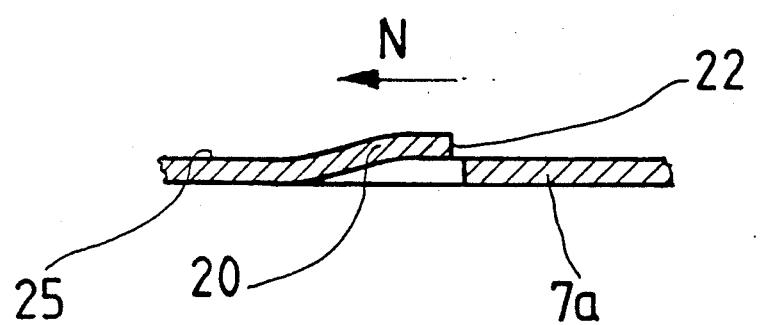
FIG. 3 shows a detail of an outer plate driveable in the driving direction of rotation.

In the vicinity of their outer circumferential face 19, the outer plates 7a, according to FIGS. 2 and 3, comprise resilient tongues 20 whose number corresponds to the number of webs 9 distributed in the housing 2. The resilient tongues 20 are produced by punching out apertures 21 extending concentrically relative to the outer face 19 of the outer plate 7a. As a result, there are obtained tongues bent so as to project axially from the plane face 25 of the plate 7a. The free end 22 of the resilient tongue 20 is positioned axially next to the plane face 25 of the plate 7a. The plate 7a, with part of its outer circumference 19, is guided in the respective slots 10 of the webs 9. The free end faces 22 of the resilient tongues 20 are supported laterally of the slots 10 on the side faces 23 of the webs 9.

To facilitate running in and the passage of the plates 7a through the slots 10 of the webs 9, an inclined face 24 starting from the outer circumferential face 19 is provided. This inclined face 24 projects into the region of the slots 10. The depth of the slots 10 is such that the plates 7a are able to rotate freely relative to the housing 2.

In case drive is effected through the housing 2 into the direction N according to FIG. 2, torque is transmitted via the webs 9 and the end faces 22 on to the resilient tongues 20 and from there to the plate 7a, i.e. the outer plate 7a rotates with the housing 2. If the direction of rotation is reversed, i.e., if the housing 2 is moved in the direction opposite to direction N, only the outer plates 7 non-rotatingly associated with the housing 2 in both directions of rotation are driven, whereas the further outer plates 7a remain stationary because the webs 9 move away from the contact with face 22 of the resilient tongues 20 associated with them against the direction of rotation N, i.e., the webs 9 move relative to the plates 7a, slide away with the slots 10 via the outer circumference 19 and approach the tongues 20 positioned in front in the direction of rotation opposite the direction N and bent axially back into the plane of the plane faces 25 of the plates 7a so that the web 9 may slide over the resilient tongue 20 against the direction of rotation N. If the direction of rotation is reversed again and if the housing 2 moves in the direction N, the webs 9 are again moved in the direction of the end faces 22 of the resilient tongues 20 axially deflected from the plane of the plane face 25 until their side faces 23 contact the end faces 22, thereby causing the coupling plates 7a to be moved. If the hub 11 is the driving coupling part, all plates 7, 7a and 13 are moved with the drive being effected in a direction of rotation extending opposite the direction N according to FIGS. 2 and 3, whereas the reduced transmission of torque takes place in direction N.

FIG. 4 shows an embodiment in which the resilient tongues 20 are associated with the plates 13 associated with the hub 11. The plates 13a are designed as adjustable inner plates, i.e. transmitting torque in one direction only. The webs 9 are arranged in grooves 8 of the hub 11. The inclined face 24 starts from the inner circumference 19a of the inner plates 13a. Otherwise the design of the resilient tongues 20 and their association with the webs 9 corresponds to the embodiment as described in connection with FIGS. 2 and 3. The reference numbers of identical parts and elements correspond to those given in FIGS. 2 and 3.

Figure 5:
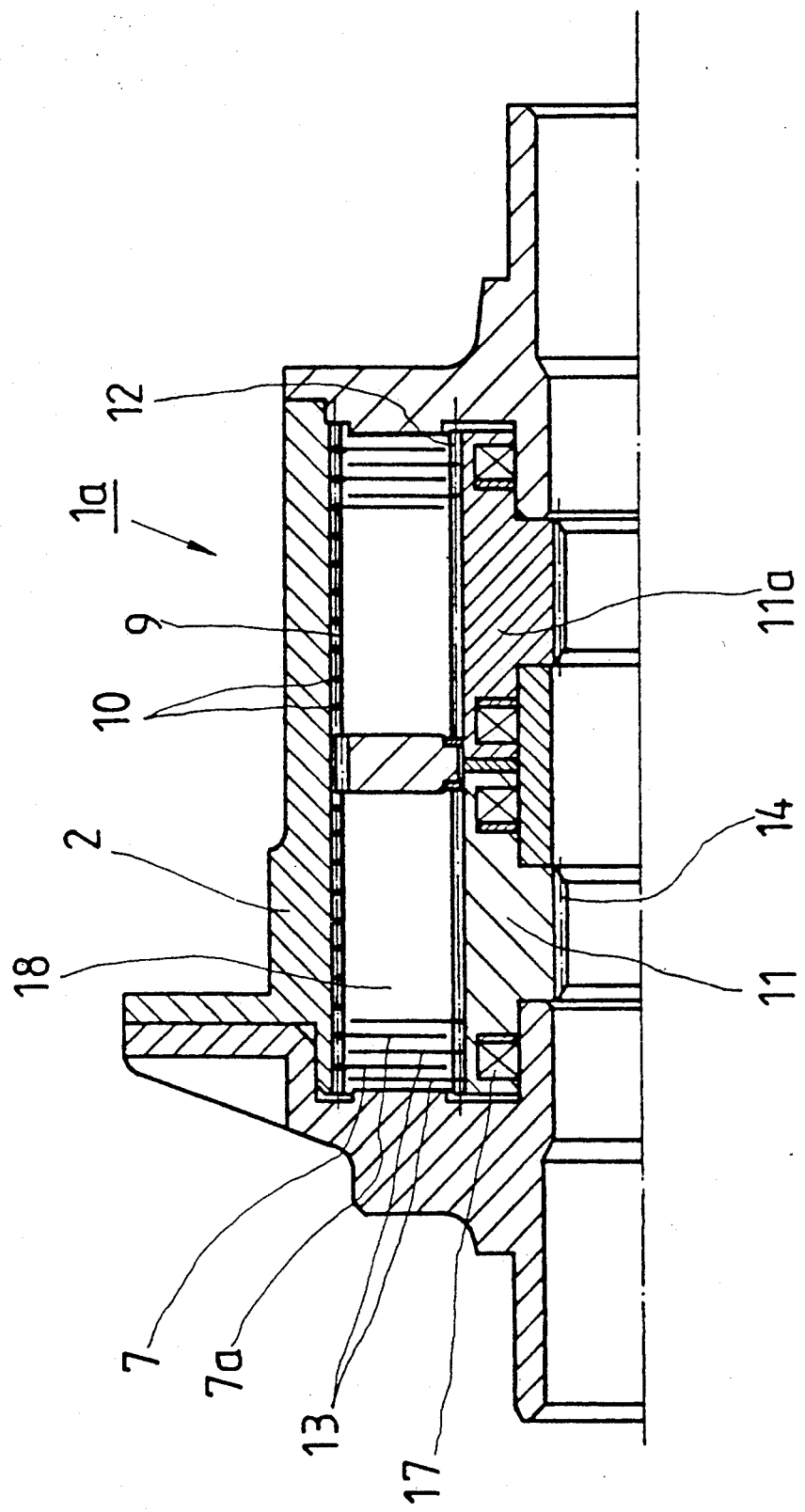
FIG. 5 shows a torque splitter.

The design involving resilient tongues 20 and associating them with plates 7a transmitting torque in one direction of rotation only may also be used in a fluid friction coupling designed as a torque splitter. Such a torque splitter is illustrated in FIG. 5. It comprises two hubs 11, 11a arranged separately and rotatably in the housing 2. Otherwise the design of the two torque splitter portions divided by a wall into the two fluid friction couplings and having a joint housing 2 corresponds to the design according to FIG. 1. Such a torque splitter is used for example in the rear axle of a four wheel drive vehicle provided with directly driven front wheels, with the torque splitter 1a having both the function of a differential and of a fluid friction coupling locking the relative movement. The torque splitter divides the torque introduced and passes it on to two outputs, e.g. the two rear wheels of the vehicle.

Figure 6:
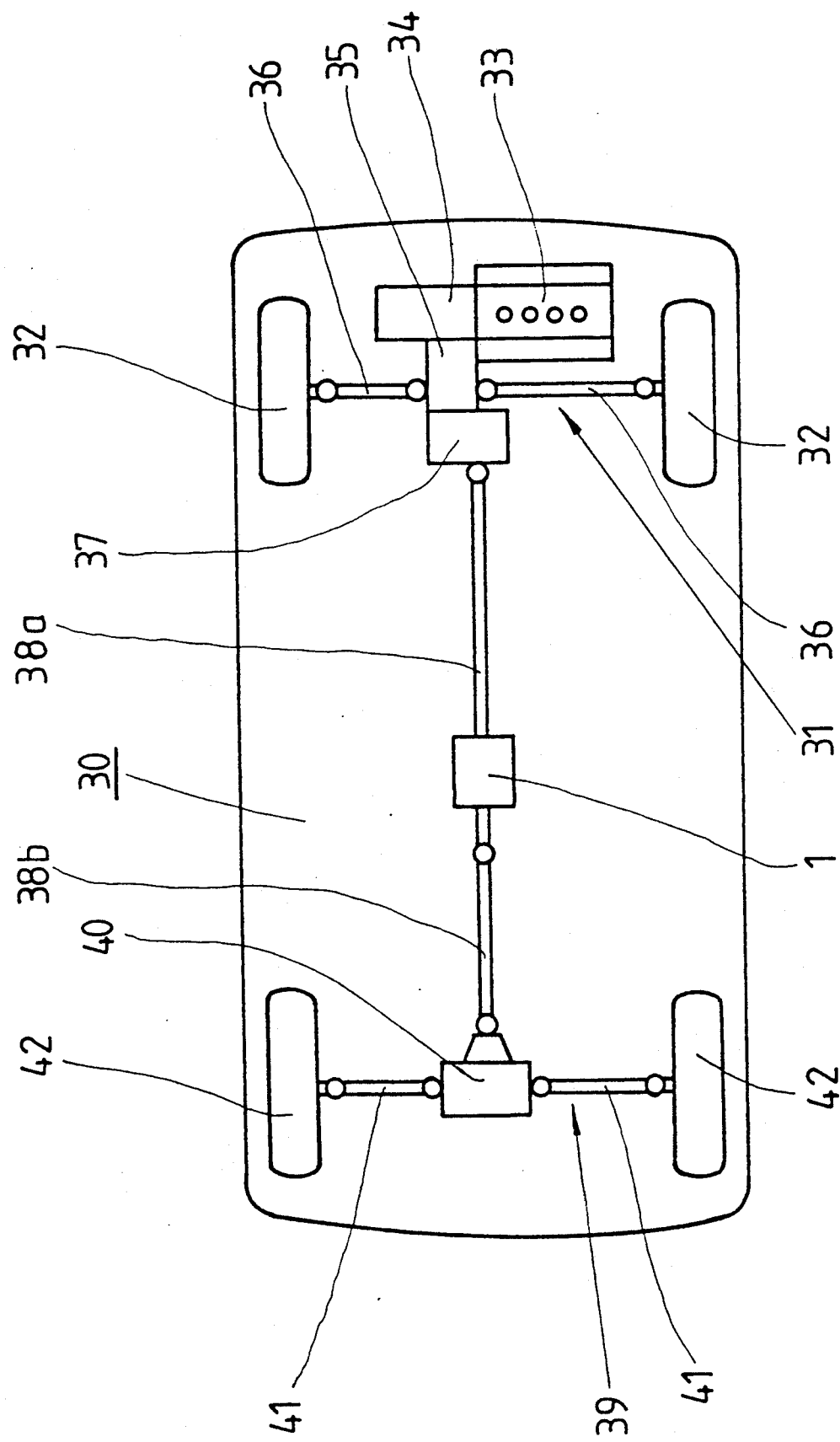
FIG. 6 shows a drive concept for a motor vehicle.

A preferred application for such fluid friction couplings 1 is a four wheel drive vehicle. The drive concept for such a vehicle 30 is shown in FIG. 6. In principle, the motor vehicle 30 is a front wheel drive vehicle. The front axle 31 and its front wheels 32 are permanently driven by the engine 33 via the manual gearbox 34 and the front axle differential 35 as well as the front side shafts 36. The drive line for the rear wheels 42 associated with the rear axle 39 is branched off from the drive of the front axle 31 via an angular drive 37. For this purpose, a multi-component propeller shaft 38 consisting of portions 38a and 38b is driven via the angular drive 37. Between these two portions there is arranged a fluid friction coupling 1 designed as illustrated in FIGS. 1 to 3. The housing 2, for example, is connected to the portion 38a of the propeller shaft 38, whereas the hub 11 is non-rotatingly connected to the portion 38b. The outer plates 7a transmitting torque in one direction of rotation only are arranged in such a way that for the purpose of forward drive, a rotary movement may be transmitted from the front axle 31 to the rear axle 39 via the rear axle differential 40 and the rear side shafts 41 to the rear wheels 42. If the vehicle 30 or the wheels 32, 42 are braked so severely that the front wheels 31 are blocked, there is generated a condition where the rear wheels 42 rotate faster than the front wheels 32. This condition corresponds to a mode of operation where the housing 2 of the fluid friction coupling 1 according to FIGS. 1 to 3 rotates faster against the direction N than the hub 11. Due to the method of functioning as described in connection with FIGS. 1 to 3, the housing 2 may overtake the plates 7a so that the front wheels 32 either transfer no torque or only a limited amount of torque to the rear wheels 42. The rear axle differential may be designed like the torque splitter as illustrated in FIG. 5.

While the invention has been illustrated and described as embodied in a fluid friction coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. A fluid friction coupling for transmitting different torques in two rotation directions, comprising:
   a housing as a first coupling part;
   at least one hub rotatably supported therein as a further coupling part;
   outer plates non-rotatingly associated with the housing; and
   inner plates non-rotatably associated with the at least one hub, the outer and the inner plates being alternately arranged in a certain sequence and the plates of at least one of the plate sets being arranged so as to be axially movable, and a part of the housing interior not occupied by plates being at least partially filled with a viscous medium, at least one of the plates (7, 7a) associated with one of the coupling parts (2 or 11) being held non-rotatably in one direction of rotation by shearing resistance and relatively rotatably in an opposite direction of rotation relative to the coupling part (2 or 11) with which it is associated, so that a different number of plates transmit torque in the one direction than the number of plates that transmit torque in the opposite direction.

2. A fluid friction coupling according to claim 1, wherein the one coupling part (2) with which the plates (7a) relatively rotatable in one direction of rotation are associated is provided with evenly circumferentially distributed webs (9) which extend parallel to the axis of rotation (x—x) and which comprise slots (10) distributed along the axis of rotation (x—x) and extending at a right angle relative thereto, the rotatable plates (7a) being guided in the slots (10) and having tongues (20) which are arranged so as to correspond to the position of the slots (10) and have free ends (22), in the direction (N) of torque transmission, supported on the webs (9) at the sides of the slots (10).

3. A fluid friction coupling according to claim 2, wherein the tongues (2) are axially resilient in the direction of the axis of rotation (x—x).

4. A fluid friction coupling according to claim 3, wherein the tongues (20) are part of the plates (7a) and are punched out or bent out from the plane face (25) of the plates.

5. A fluid friction coupling according to claim 2, wherein the webs (9) form part of the associated coupling parts (2).

6. A fluid friction coupling according to claim 2, wherein the webs (9) are separate components and are connected to the coupling part (2) in one of a form-fitting and a material-locking manner.

7. A fluid friction coupling according to claim 6, wherein the webs (9) are formed as wedges inserted into corresponding grooves (8) of the associated coupling part (2).

8. A fluid friction coupling according to claim 4, wherein the rotatable plate (7a), opposite the free end (22) of the tongues (20), has an inclined running-in face (24).

9. A fluid friction coupling according to claim 1, wherein the housing (2) is the coupling part with which the plates designed as outer plates (7a) rotatable in one direction of rotation are associated.

10. A fluid friction coupling according to claim 1, wherein the hub (11) is the coupling part with which the plate designed as inner plates rotatable in one direction of rotation are associated.

11. A fluid friction coupling according to claim 2, wherein the coupling is arranged in a driveline leading from permanently driven axle to a further driveable axle (39) of a four wheel drive vehicle (30), the coupling part (2) having the plates (7a) non-rotatingly held in only one direction of rotation being non-rotatingly connected to a drive of the permanently driven axle (31), and the tongues (20), in the direction of rotation (N) corresponding to forward traction, being non-rotatingly supported on the webs (9) of the coupling part (2).

12. A fluid friction coupling according to claim 1, wherein the viscous medium is silicone oil.

* * * * *